(12) United States Patent
Harrod et al.

(10) Patent No.: US 8,826,165 B2
(45) Date of Patent: Sep. 2, 2014

(54) SYSTEM STATUS USER INTERFACES

(75) Inventors: Gregory Ralph Harrod, Wichita, KS (US); Mimoun Abaraw, Wichita, KS (US); Bradley A. Beers, Dorr, MI (US); Grant E. Carmichael, Grand Rapids, MI (US)

(73) Assignee: Johnson Controls Technology Company, Holland, MI (US)

( * ) Notice: Subject to any disclaimer, the term of this patent is extended or adjusted under 35 U.S.C. 154(b) by 851 days.

(21) Appl. No.: 12/560,251

(22) Filed: Sep. 15, 2009

(65) Prior Publication Data

US 2010/0070907 A1 Mar. 18, 2010

Related U.S. Application Data

(60) Provisional application No. 61/097,133, filed on Sep. 15, 2008.

(51) Int. Cl.
*G06F 3/048* (2013.01)
*G05B 21/00* (2006.01)
*G05B 11/01* (2006.01)
*G06F 9/44* (2006.01)
*F24F 11/00* (2006.01)
*G05B 19/042* (2006.01)

(52) U.S. Cl.
CPC .............. *G06F 8/34* (2013.01); *F24F 11/0086* (2013.01); *G05B 19/042* (2013.01)
USPC .............. 715/771; 715/772; 700/276; 700/17

(58) Field of Classification Search
CPC ...... G06F 8/34; F24F 11/0086; G05B 19/042
USPC ................... 715/771, 772, 833, 277; 700/17, 700/276–278
See application file for complete search history.

(56) References Cited

U.S. PATENT DOCUMENTS

| | | |
|---|---|---|
| 5,305,953 A | 4/1994 | Rayburn et al. |
| 5,402,845 A | 4/1995 | Jeffery et al. |
| 5,417,077 A | 5/1995 | Jeffery et al. |
| 5,417,368 A | 5/1995 | Jeffery et al. |
| 5,631,825 A * | 5/1997 | van Weele et al. .............. 700/83 |
| 6,070,110 A | 5/2000 | Shah et al. |
| 6,155,341 A | 12/2000 | Thompson et al. |
| 6,449,533 B1 | 9/2002 | Mueller et al. |
| 6,619,555 B2 | 9/2003 | Rosen |
| 6,621,507 B1 | 9/2003 | Shah |
| 6,824,069 B2 | 11/2004 | Rosen |
| 6,994,620 B2 | 2/2006 | Mills |
| 7,000,849 B2 | 2/2006 | Ashworth et al. |
| 7,017,827 B2 | 3/2006 | Shah et al. |
| 7,028,912 B1 * | 4/2006 | Rosen .......................... 236/1 C |
| 7,114,554 B2 | 10/2006 | Bergman et al. |
| 7,152,806 B1 | 12/2006 | Rosen |
| 7,156,316 B2 | 1/2007 | Kates |
| 7,188,002 B2 | 3/2007 | Chapman, Jr. et al. |

(Continued)

*Primary Examiner* — Tadeese Hailu
(74) *Attorney, Agent, or Firm* — Fletcher Yoder, P.C.

(57) ABSTRACT

Controllers for controlling heating, ventilating, air conditioning, and cooling (HVAC) systems are provided. The controllers include graphical user interfaces for user adjustment of system settings. The graphical user interfaces also may be designed to present information that facilitates user understanding of system operations. In certain embodiments, the graphical user interfaces may display virtual representations of HVAC systems with graphical elements representing units and/or operating status of the HVAC systems.

20 Claims, 9 Drawing Sheets

(56) References Cited

U.S. PATENT DOCUMENTS

| | | |
|---|---|---|
| 7,212,887 B2 | 5/2007 | Shah et al |
| 7,222,494 B2 | 5/2007 | Peterson et al. |
| 7,225,054 B2 | 5/2007 | Amundson et al. |
| 7,243,004 B2 | 7/2007 | Shah et al. |
| 7,287,709 B2 | 10/2007 | Proffitt et al. |
| 7,308,384 B2 | 12/2007 | Shah et al. |
| 7,364,353 B2 | 4/2008 | Kolk |
| 7,460,933 B2 | 12/2008 | Chapman, Jr. et al. |
| 2004/0117330 A1* | 6/2004 | Ehlers et al. .................. 705/412 |
| 2005/0119766 A1 | 6/2005 | Amundson et al. |
| 2005/0194455 A1* | 9/2005 | Alles .............................. 236/1 B |
| 2005/0270151 A1* | 12/2005 | Winick ....................... 340/539.1 |
| 2006/0192021 A1 | 8/2006 | Schultz et al. |
| 2006/0206220 A1* | 9/2006 | Amundson ...................... 700/87 |
| 2007/0255535 A1* | 11/2007 | Marro et al. .................. 702/194 |
| 2007/0255536 A1* | 11/2007 | Simmons et al. .................. 703/1 |
| 2009/0090115 A1 | 4/2009 | Boydstun et al. |

* cited by examiner

SYSTEM STATUS USER INTERFACES

CROSS REFERENCE TO RELATED APPLICATIONS

This application claims priority from and the benefit of U.S. Provisional Application Ser. No. 61/097,133, entitled "CONTROLLER AND ASSOCIATED USER INTERFACE FOR CLIMATE CONDITIONING SYSTEM", filed Sep. 15, 2008, which is hereby incorporated by reference.

BACKGROUND

The invention relates generally to heating, ventilating, air conditioning, and refrigeration systems, and controllers for configuring these systems.

A wide range of applications exist for heating, ventilating, and air conditioning (HVAC) systems. For example, residential, light commercial, commercial, and industrial systems are used to control temperatures and air quality in residences and buildings. Such systems often are dedicated to either heating or cooling, although systems are common that perform both of these functions. Very generally, these systems operate by implementing a thermal cycle in which fluids are heated and cooled to provide the desired temperature in a controlled space, typically the inside of a residence or building. Similar systems are used for vehicle heating and cooling, and as well as for general refrigeration.

Residential systems generally include an indoor unit, such as an air handler or a furnace, and an outdoor unit, such as a heat pump or an air conditioner. A system controller, such as a thermostat, may be connected to control circuits within the indoor and outdoor units to control operation of the HVAC system. A user may adjust operating parameters of the HVAC system, such as the temperature of a heated or cooled space, through a user interface. However, in certain applications, the user interface may not allow for adjustment of more complex parameters. Further, a user may not understand how to adjust all but the simplest system parameters or how the components of the HVAC system function together.

SUMMARY

The present invention relates to a control device that includes a communication interface suitable for operable connection to one or more units of a heating, ventilating, air conditioning, or cooling system. The control device also includes a processor capable of detecting through the communication interface an operating status of each of the units, and a display capable of displaying a virtual representation of the heating, ventilating, air conditioning, or cooling system with graphical elements corresponding to each of the units and with indicators identifying the operating status of each of the units.

The present invention also relates to a method that includes displaying a virtual representation of a heating, ventilating, air conditioning, or cooling system with graphical elements depicting units of the heating, ventilating, air conditioning, or cooling system. The method further includes detecting a change in an operating status of one of the units, and varying the display of at least one of the graphical elements in response to detecting the change.

The present invention further relates to a method that includes displaying a virtual representation of a heating, ventilating, air conditioning, or cooling system with graphical elements depicting units of the heating, ventilating, air conditioning, or cooling system, determining one or more additional units that may be connected to the heating, ventilating, air conditioning, or cooling system, and displaying a recommendation describing the one or more additional units.

DRAWINGS

Figure 5:
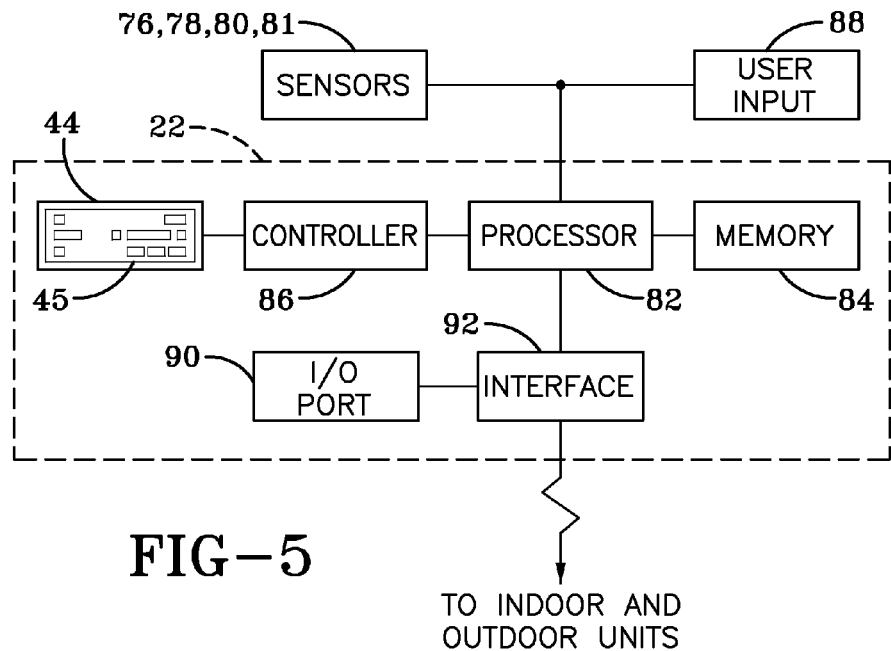
FIG. 5 is a block diagram of an embodiment of a system controller.
Figure 7:
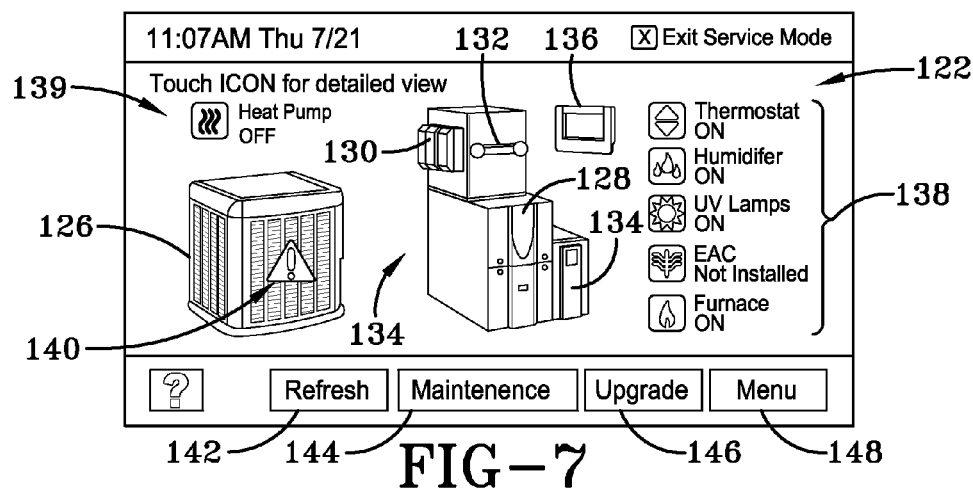

FIG. 7 a view of a screen of the controller of FIG. 5 with a virtual representation of the HVAC system.

Figure 8:
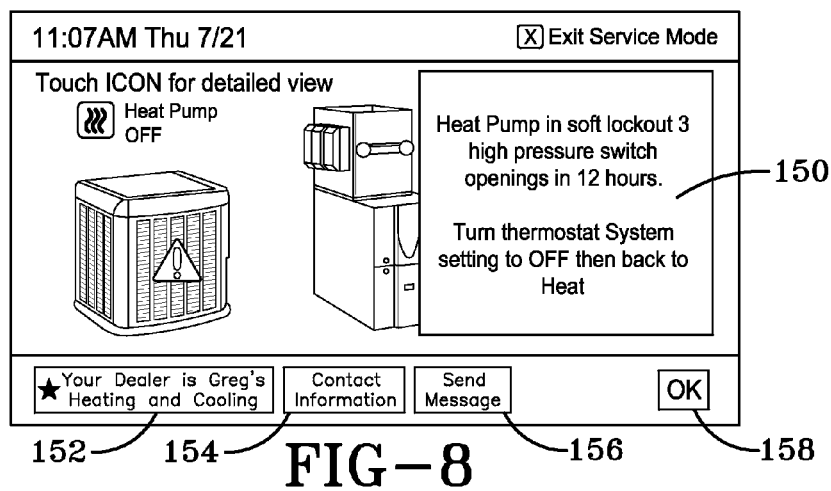

FIG. 8 is a view of the screen of FIG. 7 after selection of a fault indicator.

Figure 9:
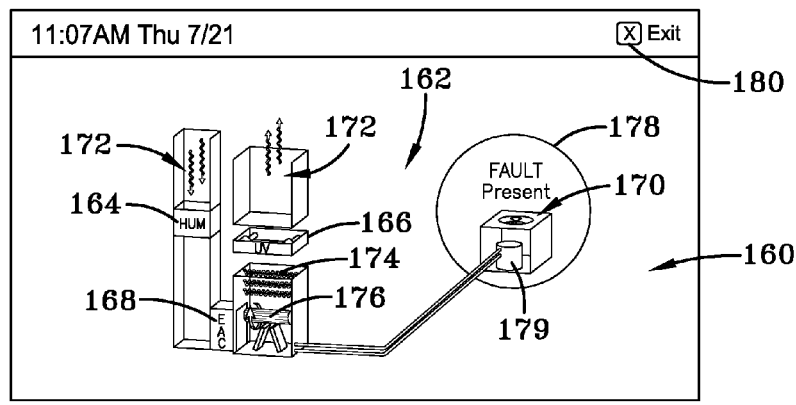

FIG. 9 is a view of a screen of the controller of FIG. 5 with another embodiment of a virtual representation of the HVAC system.

Figure 10:
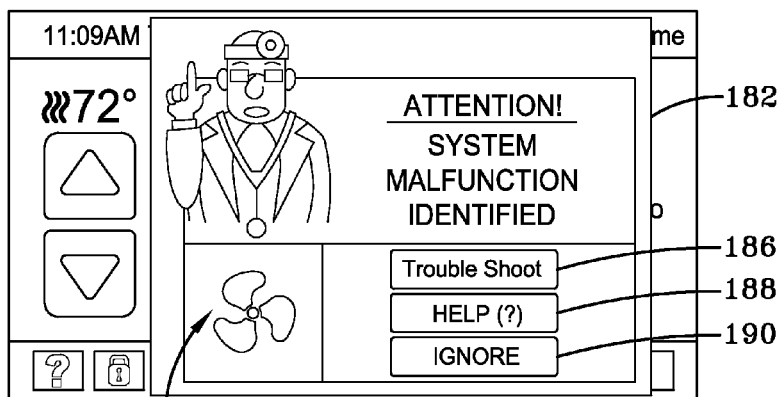

FIG. 10 is a view of a screen of the controller of FIG. 5 displaying a fault alert.

Figure 11:
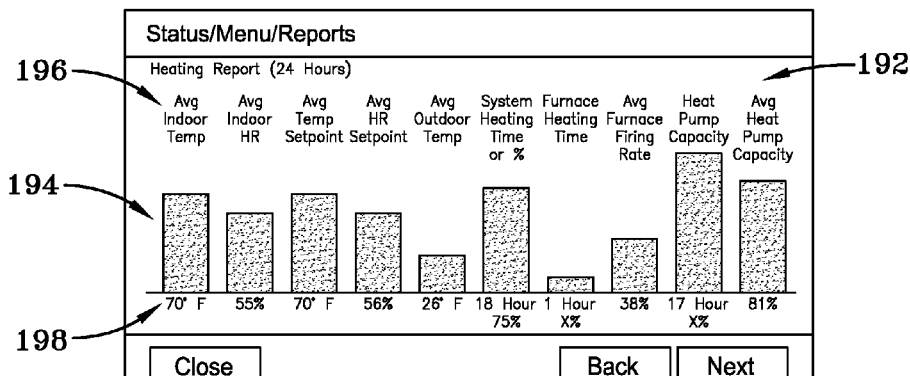

FIG. 11 is a view of a screen of the controller of FIG. 5 displaying an operating report.

Figure 12:
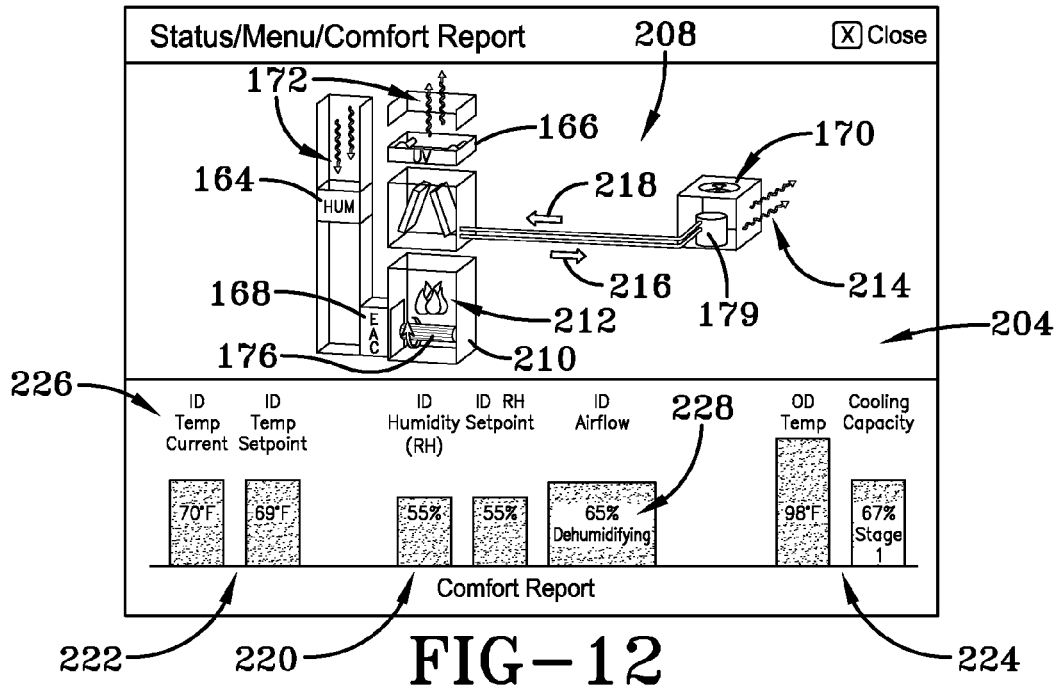

FIG. 12 is a view of a screen of the controller of FIG. 5 displaying a virtual representation of the HVAC system with an operating report.

Figure 13:
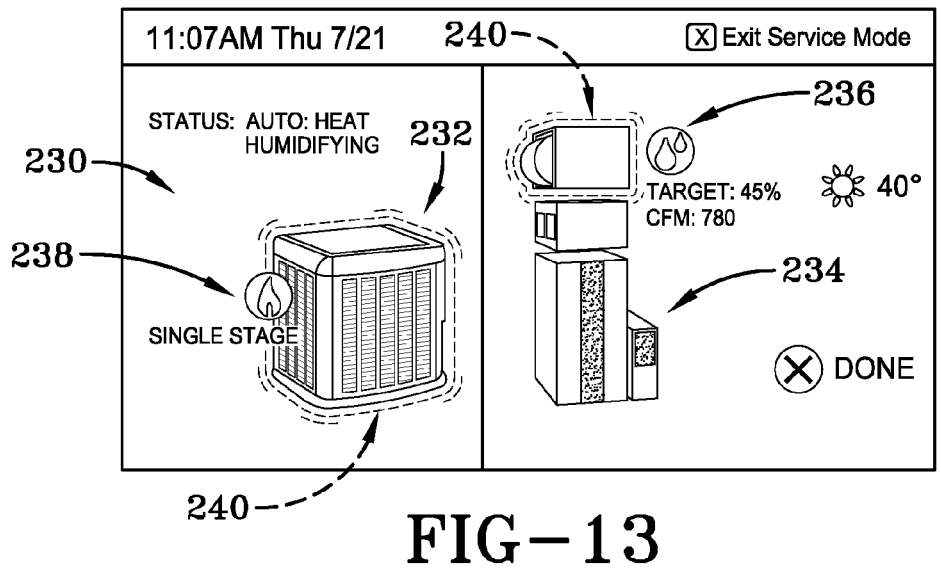

FIG. 13 is a view of a screen of the controller of FIG. 5 displaying another embodiment of a virtual representation of the HVAC system.

Figure 14:
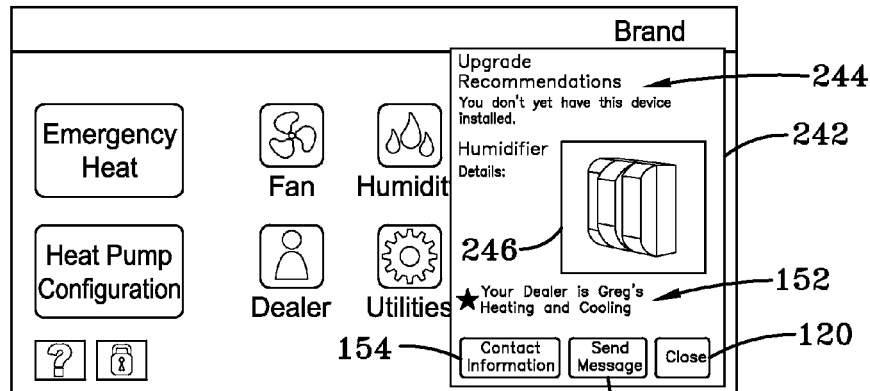

FIG. 14 is a view of a screen of the controller of FIG. 5 displaying a system upgrade recommendation.

Figure 15:
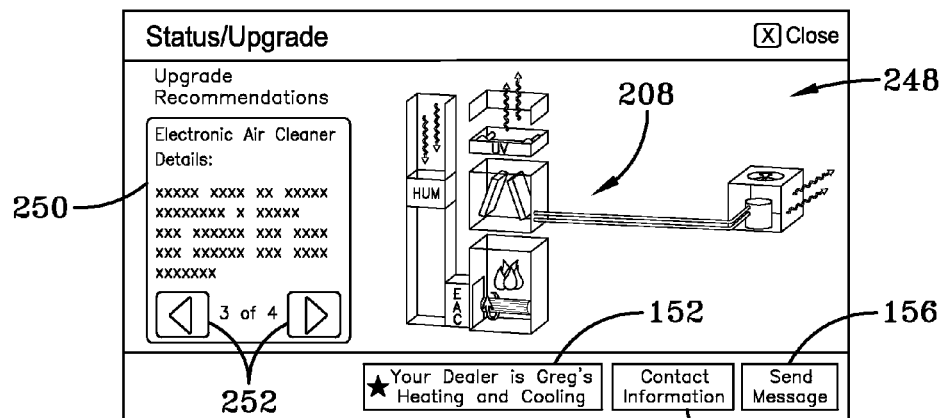

FIG. 15 is a view of a screen of the controller of FIG. 5 displaying another embodiment of a system upgrade recommendation.

Figure 16:
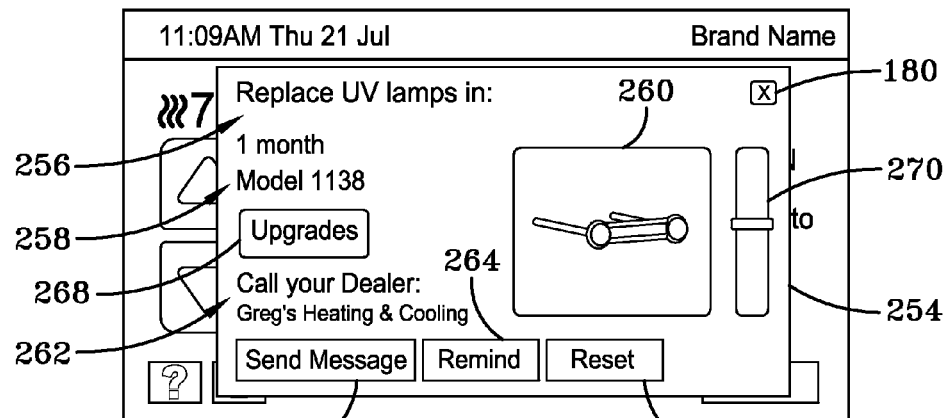

FIG. 16 is a view of a screen of the controller of FIG. 5 that displaying a service recommendation.

Figure 17:
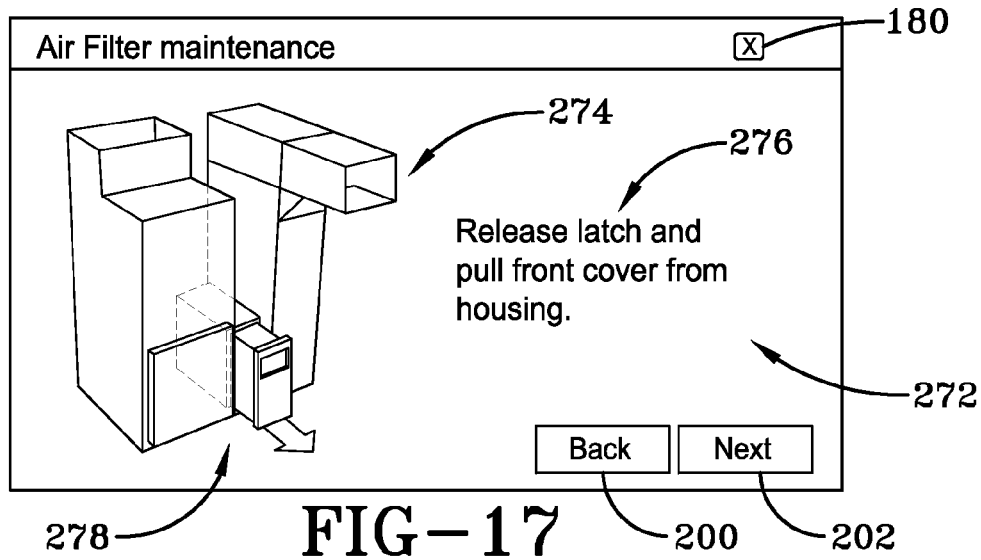

FIG. 17 is a view of a screen of the controller of FIG. 5 displaying maintenance information.

Figure 18:
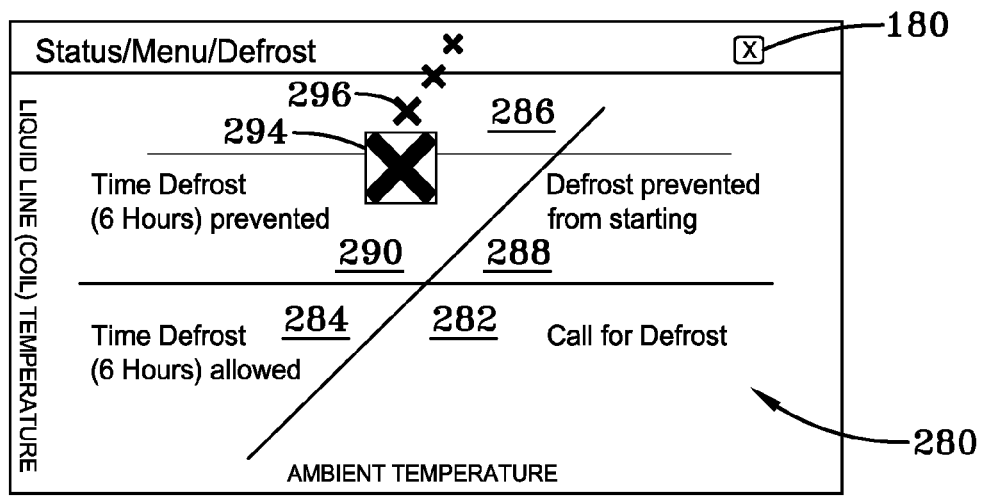

FIG. 18 is a view of a screen of the controller of FIG. 5 displaying operational information.

DETAILED DESCRIPTION

The present disclosure is directed to controllers with user interfaces that facilitate user understanding of HVAC system operation. In general, HVAC systems may include many units that function together to provide heated, cooled, and/or conditioned air to an environment. However, users may not fully understand how the units are connected or where the units are located in the HVAC systems. Further, when a fault occurs it may be difficult for users to identify the source of the fault. Accordingly, the present disclosure relates to controllers with graphical user interfaces that display a virtual representation of the HVAC system. The virtual representation may facilitate user understanding of how the equipment within the HVAC system operates together. Further, the graphical user interfaces may include graphical elements and/or animation that depicts the current operating status of the equipment in the HVAC system. In certain embodiments, the graphical user interfaces may include fault indicators that may be displayed on the virtual representation to identify faults. Further, the graphical user interfaces may display information describing available system upgrades, maintenance activities, troubleshooting steps, and operating conditions.

Figure 1:
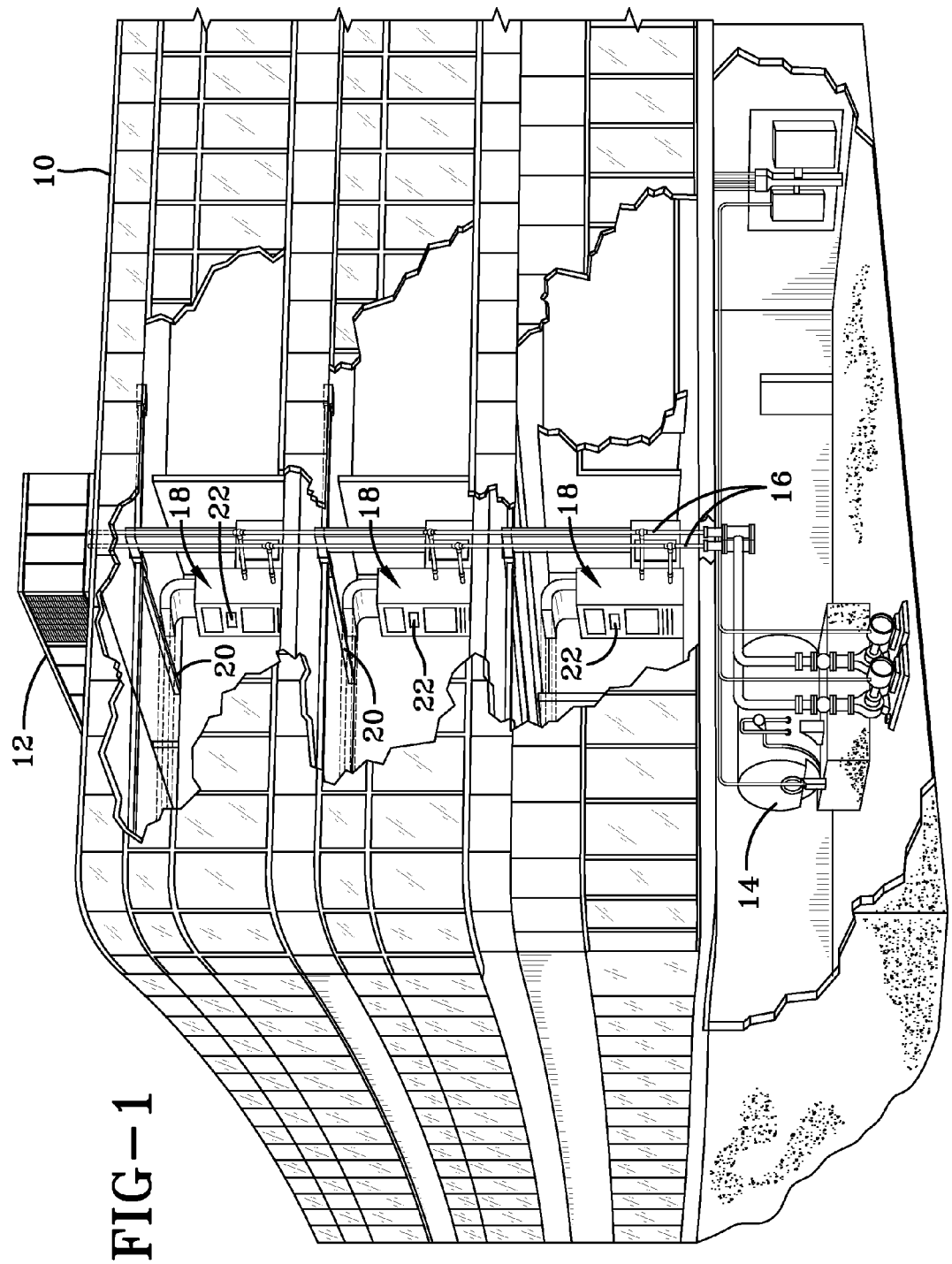
FIG. 1 is a perspective view of an embodiment of a commercial or industrial HVAC system that employs system controllers with user interfaces.

FIG. 1 illustrates an exemplary application, in this case an HVAC system for building environmental management, that may employ one or more system controllers with user interfaces. A building 10 is cooled by a system that includes a chiller 12 and a boiler 14. As shown, chiller 12 is disposed on the roof of building 10 and boiler 14 is located in the basement; however, the chiller and boiler may be located in other equipment rooms or areas next to the building. Chiller 12 is an air cooled or water cooled device that implements a refrigeration cycle to cool water. Chiller 12 may be a stand-alone unit or may be part of a single package unit containing other equipment, such as a blower and/or integrated air handler. Boiler 14 is a closed vessel that includes a furnace to heat water. The water from chiller 12 and boiler 14 is circulated through building 10 by water conduits 16. Water conduits 16 are routed to air handlers 18, located on individual floors and within sections of building 10.

Air handlers 18 are coupled to ductwork 20 that is adapted to distribute air between the air handlers and may receive air from an outside intake (not shown). Air handlers 18 include heat exchangers that circulate cold water from chiller 12 and hot water from boiler 14 to provide heated or cooled air. Fans, within air handlers 18, draw air through the heat exchangers and direct the conditioned air to environments within building 10, such as rooms, apartments, or offices, to maintain the environments at a designated temperature. A controller 22, shown here as including a thermostat, may be used to designate the temperature of the conditioned air. Controller 22 also may be used to control the flow of air through and from air handlers 18 and to diagnose mechanical or electrical problems with the air handlers 18. Other devices may, of course, be included in the system, such as control valves that regulate the flow of water and pressure and/or temperature transducers or switches that sense the temperatures and pressures of the water, the air, and so forth. Moreover, the control device may communicate with computer systems that are integrated with or separate from other building control or monitoring systems, and even systems that are remote from the building.

Figure 2:
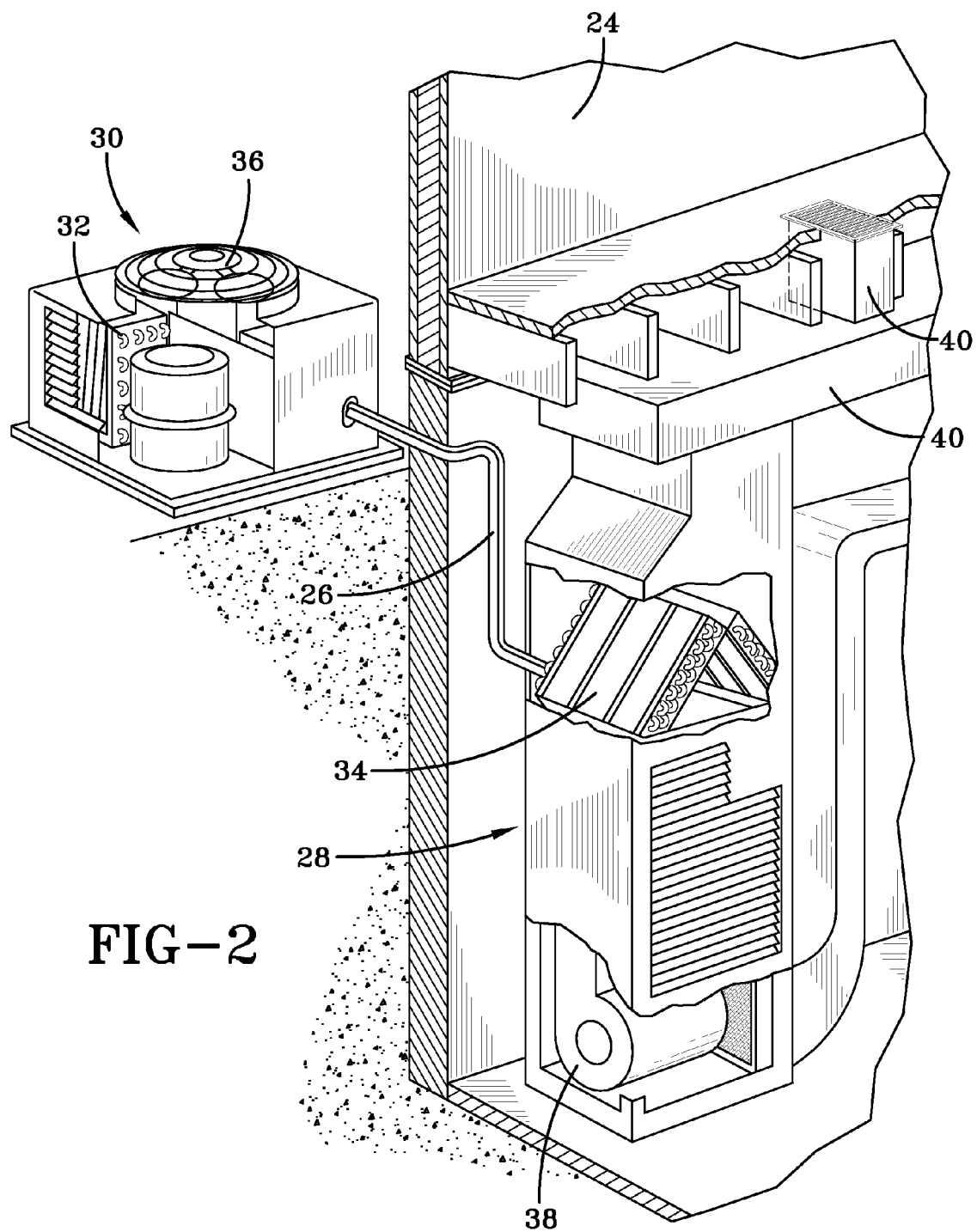
FIG. 2 is a perspective view of an embodiment of a residential HVAC system that employs system controllers with user interfaces.

FIG. 2 illustrates a residential heating and cooling system. The residential heating and cooling system may provide heated and cooled air to a residential structure, as well as provide outside air for ventilation and provide improved indoor air quality (IAQ) through devices such as ultraviolet lights and air filters. In general, a residence 24 may include refrigerant conduits 26 that operatively couple an indoor unit 28 to an outdoor unit 30. Indoor unit 28 may be positioned in a utility room, an attic, a basement, and so forth. Outdoor unit 30 is typically situated adjacent to a side of residence 24 and is covered by a shroud to protect the system components and to prevent leaves and other contaminants from entering the unit. Refrigerant conduits 26 transfer refrigerant between indoor unit 28 and outdoor unit 30, typically transferring primarily liquid refrigerant in one direction and primarily vaporized refrigerant in an opposite direction.

When the system shown in FIG. 2 is operating as an air conditioner, a heat exchanger 32 in outdoor unit 30 serves as a condenser for re-condensing vaporized refrigerant flowing from indoor unit 28 to outdoor unit 30 via one of the refrigerant conduits 26. In these applications, a heat exchanger 34 of the indoor unit functions as an evaporator. Specifically, heat exchanger 34 receives liquid refrigerant (which may be expanded by an expansion device, not shown) and evaporates the refrigerant before returning it to outdoor unit 30.

Outdoor unit 30 draws environmental air through heat exchanger 32 using a fan 36 and expels the air above the outdoor unit. When operating as an air conditioner, the air is heated by heat exchanger 32 within outdoor unit 30 and exits the unit at a temperature higher than it entered. Indoor unit 28 includes a blower or fan 38 that directs air through indoor heat exchanger 34, where the air is cooled when the system is operating in air conditioning mode, and then circulates the air through ductwork 40 that directs the air to the residence 24. The overall system operates to maintain a desired temperature as set by a system controller 22 (FIG. 1). When the temperature sensed inside the residence is higher than the set point on the thermostat (plus a small amount), the air conditioner may become operative to refrigerate additional air for circulation through the residence. When the temperature reaches the set point (minus a small amount), the unit may stop the refrigeration cycle temporarily.

When the unit in FIG. 2 operates as a heat pump, the roles of heat exchangers 32 and 34 are reversed. That is, heat exchanger 32 of outdoor unit 30 will serve as an evaporator to evaporate refrigerant and thereby cool air entering outdoor unit 30 as the air passes over outdoor heat exchanger 32. Indoor heat exchanger 34 will receive a stream of air blown over it and will heat the air by condensing the refrigerant.

Figure 3:
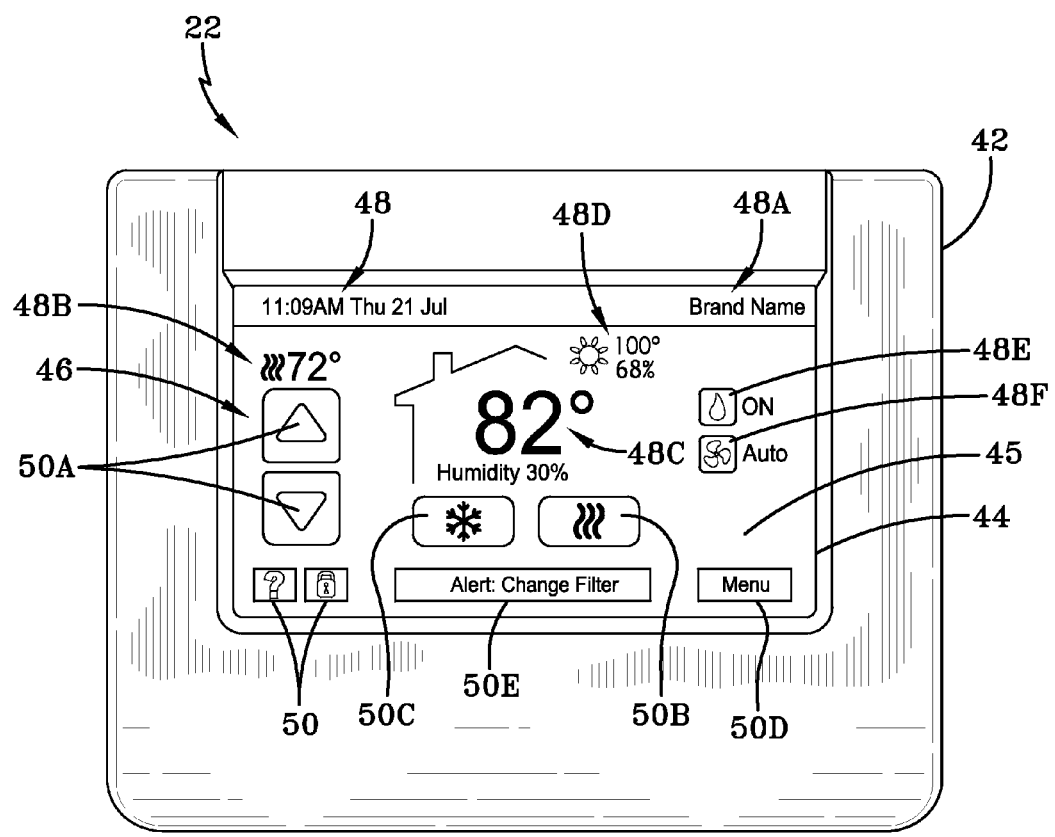
FIG. 3 is a perspective view of an embodiment of a system controller for an HVAC system.

FIG. 3 is a front view of controller 22, shown here as including a digital programmable thermostat. In other embodiments, the controller may be any suitable temperature controller. The controller 22 may be used to control one or more indoor and/or outdoor units. Controller 22 is protected by an enclosure 42 that protects the interior components from physical damage and shields them from environmental hazards such as dust and electromagnetic interference. The enclosure may be formed from any suitable material such as plastic, metal, or a composite material. A display 44 is mounted within enclosure 42 and may be used to display various images and text generated by the device. The display may be any type of display such as a liquid crystal display, a light emitting diode display, an organic light emitting diode display, or other suitable display and may be capable of displaying text strings and/or high-resolution color graphics. Additionally, the display includes a touch-sensitive element, such as a touch screen 45.

Touch screen 45 may receive input from a user's or object's touch and may send the information to a processor within the controller 22, which may interpret the touch event and perform a corresponding action. According to certain embodiments, the touch screen may employ resistive touch screen technology. However, in other embodiments, the touch screen may employ any suitable type of touch screen technology, such as capacitive, infrared, surface acoustic wave, electromagnetic, or near field imaging. Furthermore, touch screen 45 may employ single point or multipoint sensing.

Display 44 may be used to display a graphical user interface (GUI) 46 that allows a user to interact with the controller. GUI 46 may include various layers, windows, screens, templates, elements, or other components that may be displayed in all, or a portion, of display 44. Generally, GUI 46 may include textual and graphical elements that represent applications and functions of controller 22. For example, user GUI 46 may include status indicators 48 that display the status of the system and/or the environment. For example, an indicator 48B may display the operational mode (i.e., heating or cooling) and the temperature set point, an indicator 48C may display the current temperature and humidity, and an indicator 48D may display the weather conditions, among others. In another example, indicators 40E and 40F may display the humidity control status and the fan speed, respectively. In certain embodiments, the status indicators 48 also may include one or more brand indicators 48A that display information identifying the brand of controller 22.

GUI 46 also may include graphical elements 50 that may represent icons, buttons, sliders, menu bars, and the like. Graphical elements 50 may be selected by a user through the touch screen. For example, graphical elements 50A may be selected to increase or decrease the temperature set point. In another example, graphical elements 50B and 50C may be selected to change the system mode between heating and cooling. A graphical element 50D also may be selected by a user to display screens with menus and/or submenus for adjusting system settings and/or operation parameters of the HVAC system. Further, a graphical element 50E may notify a user that maintenance is required and may be selected to obtain maintenance information. As may be appreciated, the types and functionality of the graphical elements may vary depending on system functionality, system settings, and system equipment, among others. Further, in certain embodiments, controller 22 may include physical inputs, such as buttons, wheels, knobs, or the like, for receiving user input instead of, in addition to, or in combination with graphical elements 50.

Figure 4:
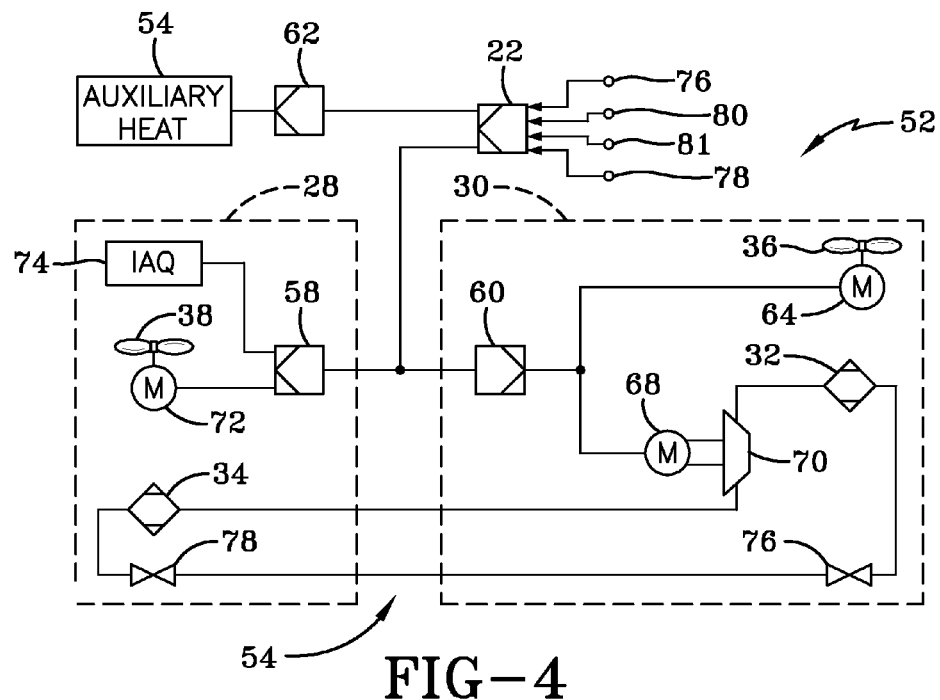
FIG. 4 is a block diagram of an embodiment of an HVAC system that employs a system controller.

FIG. 4 is a block diagram of an HVAC system 52 that includes controller 22, indoor unit 28 functioning as an air handler, and outdoor unit 30 functioning as a heat pump. Refrigerant flows through system 52 within a closed refrigeration loop 54 between outdoor unit 30 and indoor unit 28. The refrigerant may be any fluid that absorbs and extracts heat. For example, the refrigerant may be hydrofluorocarbon (HFC) based R-410A, R-407C, or R-134a. HVAC system 52 also includes an auxiliary heat system 56 that may be used to provide additional heating. For example, auxiliary heat system 56 may include a gas furnace, a fossil fuel furnace, an electric heat system, or the like.

The operation of indoor and outdoor units 28 and 30 is controlled by control circuits 58 and 60, respectively. Further, the operation of auxiliary heat system 56 is controlled by a control circuit 62. Control circuits 58, 60, and 62 may execute hardware or software control algorithms to govern operations of HVAC system 52. According to certain embodiments, the control circuits may include one or more microprocessors, analog to digital converters, non-volatile memories, and interface boards. In certain embodiments, the control circuits may be fitted with or coupled to auxiliary control boards that allow conventional 24 VAC wiring to be controlled through serial communications. Further, in certain embodiments, the control circuits may be controlled through a wireless network.

Control circuits 58, 60, and 62 may receive control signals from controller 22 and transmit the signals to equipment located within indoor unit 28, outdoor unit 30, and auxiliary heat system 54. For example, outdoor control circuit 60 may route control signals to a motor 64 that powers fan 66 and to a motor 68 that powers a compressor 70. Indoor control circuit 58 may route control signals to a motor 72 that powers fan 38. Indoor control circuit 58 also may route control circuits to equipment included within an Indoor Air Quality (IAQ) system 74. For example, IAQ system 74 may include one or more air cleaners, UV air purifiers, humidifiers, and/or ventilators, among others. The control circuits also may transmit control signals to other types of equipment such as valves 76 and 78, sensors, and switches.

Controller 22 may operate to control the overall heating and cooling provided by indoor unit 28, outdoor unit 30, and auxiliary heat system 54. Indoor and outdoor units 28 and 30 include heat exchangers 34 and 32 that function either as an evaporator or a condenser depending on the heat pump operation mode. For example, when HVAC system 52 is operating in cooling (or "AC") mode, outside heat exchanger 32 functions as a condenser, releasing heat to the outside air, while inside heat exchanger 34 functions as an evaporator, absorbing heat from the inside air. When HVAC system 52 is operating in heating mode, outside heat exchanger 32 functions as an evaporator, absorbing heat from the outside air, while inside heat exchanger 34 functions as a condenser, releasing heat to the inside air. A reversing valve (not shown) may be positioned on closed loop 54 to control the direction of refrigerant flow and thereby to switch the heat pump between heating mode and cooling mode.

HVAC system 52 also includes two metering devices 76 and 78 for decreasing the pressure and temperature of the refrigerant before it enters the evaporator. The metering devices also regulate the refrigerant flow entering the evaporator so that the amount of refrigerant entering the evaporator equals, or approximately equals, the amount of refrigerant exiting the evaporator. The metering device used depends on the heat pump operation mode. For example, when HVAC system 52 is operating in cooling mode, refrigerant bypasses metering device 76 and flows through metering device 78 before entering inside heat exchanger 34, which acts as an evaporator. In another example, when HVAC system 52 is operating in heating mode, refrigerant bypasses metering device 78 and flows through metering device 76 before entering outside heat exchanger 32, which acts as an evaporator. According to other exemplary embodiments, a single metering device may be used for both heating mode and cooling mode.

The refrigerant enters the evaporator, which is outside heat exchanger 32 in heating mode and inside heat exchanger 34 in cooling mode, as a low temperature and pressure liquid. Some vapor refrigerant also may be present as a result of the expansion process that occurs in metering device 76 and 78. The refrigerant flows through tubes in the evaporator and absorbs heat from the air changing the refrigerant into a vapor. In cooling mode, the indoor air flowing across the multichannel tubes also may be dehumidified. The moisture from the air may condense on the outer surface of the multichannel tubes and consequently be removed from the air.

After exiting the evaporator, the refrigerant flows into compressor 70. Compressor 70 decreases the volume of the refrigerant vapor, thereby, increasing the temperature and pressure of the vapor. The compressor may be any suitable compressor such as a screw compressor, reciprocating compressor, rotary compressor, swing link compressor, scroll compressor, or turbine compressor.

From compressor 70, the increased temperature and pressure vapor refrigerant flows into a condenser, the location of which is determined by the heat pump mode. In cooling mode, the refrigerant flows into outside heat exchanger 32 (acting as a condenser). Fan 36, which is powered by motor 64, draws air across the tubes containing refrigerant vapor. According to certain exemplary embodiments, the fan may be replaced by a pump that draws fluid across the multichannel tubes. The heat from the refrigerant is transferred to the outside air causing the refrigerant to condense into a liquid. In heating mode, the refrigerant flows into inside heat exchanger 34 (acting as a condenser). Fan 38, which is powered by motor 72, draws air across the tubes containing refrigerant vapor. The heat from the refrigerant is transferred to the inside air causing the refrigerant to condense into a liquid.

After exiting the condenser, the refrigerant flows through the metering device (76 in heating mode and 78 in cooling mode) and returns to the evaporator (outside heat exchanger 32 in heating mode and inside heat exchanger 34 in cooling mode) where the process begins again.

In both heating and cooling modes, motor 68 drives compressor 70 and circulates refrigerant through reversible refrigeration/heating loop 54. The motor may receive power either directly from an AC or DC power source or from a variable speed drive (VSD). The motor may be a switched reluctance (SR) motor, an induction motor, an electronically commutated permanent magnet motor (ECM), or any other suitable motor type.

The operation of motor 68 is controlled by control circuit 60. Control circuit 46 may receive control signals from controller 22. In certain embodiments, controller 22 may receive information from a sensor 76 that measures the ambient indoor air temperature and a sensor 78 that measures indoor humidity. Controller 22 then compares the air temperature to the temperature set point (which may be input by a user) and engages compressor motor 68 and fan motors 64 and 72 to run the cooling system if the air temperature is above the temperature set point. In heating mode, controller 22 compares the air temperature from sensor 76 to the temperature set point and engages motors 64, 68, and 72 to run the heating system if the air temperature is below the temperature set point. According to certain embodiments, sensors 76 and 78 may be located within and/or may be an integral part of controller 22. However, in other embodiments, sensors 76 and 78 may be external devices connected to controller 22, for example, through a wired or wireless connection.

Control circuit 60 and controller 22 also may initiate a defrost cycle when the system is operating in heating mode. When the outdoor temperature approaches freezing, moisture in the outside air that is directed over outside heat exchanger 32 may condense and freeze on the coil. Controller 22 may receive information from one or more sensors 80 that measure the outside air temperature and, in certain embodiments, the temperature of outside heat exchanger 32. These sensors provide temperature information to the control circuit 60 which determines when to initiate a defrost cycle.

Controller 22 also may use temperature information from outdoor temperature sensor 80 to determine when to enable the auxiliary heating system 54. For example, if controller 22 receives a signal from temperature sensor 80 indicating that the outdoor temperature has dropped below a certain set point, controller 22 may disable operation of indoor unit 28 and outdoor unit 30 and enable auxiliary heating system 54. In certain embodiments, HVAC system 52 also may include a sensor 81 that senses the level of fuel within a fuel source for auxiliary heating system 54. For example, auxiliary heating system 54 may be a furnace that uses fuel from a propane tank. In this example, sensor 81 may measure the level of fuel within the propane tank and may provide this information to controller 22. Controller 22 may then determine when to operate auxiliary heating system 54, based at least in part on the fuel information provided by sensor 81. For example, if the fuel level is low, controller 22 may operate indoor and outdoor units 28 and 30 for heating, rather than operating auxiliary heating system 54. Further, in certain embodiments, depending on the outdoor temperature, among other factors, controller 22 may operate the auxiliary heating system 54 in conjunction with indoor unit 28 and outdoor unit 30.

FIG. 5 is a simplified block diagram illustrating various components and features of controller 22 in accordance with one embodiment. The block diagram includes display 36 discussed above with respect to FIG. 3, as well as many other components. As noted above with respect to FIG. 4, the controller 22 may be used to control operation of an HVAC system with one or more indoor and outdoor units, such as indoor unit 28, outdoor unit 30, and auxiliary heating system 54. In certain embodiments, each of the units may include a control circuit communicatively coupled to the controller. However, in other embodiments, only some of the units may include control circuits, and the units without control circuits may be wired to and controlled by control circuits within the other units and/or by the controller. Further, the controller may be employed to control a system with only one unit. For example, an HVAC system may provide only heating using an indoor unit such as a furnace. No outdoor unit may be included and no refrigerant may be involved.

The operation of controller 22 may be controlled by a processor 82 that provides the processing capability for the controller. In certain embodiments, the processor 82 may include one or more microprocessors, instruction set processors, graphics processors, and/or related chip sets. Processor 82 may cooperate with a memory 84 that stores executable and/or machine-readable code, data, and instructions for processor 82. For example, the memory 84 may store look up tables and/or algorithms for GUI 46 (FIG. 3). Memory 84 also may store protocol information and instructions for allowing communication between controller 22 and connected units. The memory may include volatile memory such as random access memory and/or non-volatile memory such as read only memory, flash memory, a hard drive, or any other suitable optical, magnetic, or solid-state computer readable media, as well as a combination thereof.

Memory 72 also may store components of GUI 46 (FIG. 3), such as graphical elements, screens, and templates, that may be shown on display 44. A controller 86 may provide the infrastructure for exchanging data between processor 82 and display 44. According to certain embodiments, controller 86 may be an integrated circuit. Further, controller 86 may exist as a separate component or be integrated into display 44 or processor 82. According to exemplary embodiments, controller 86 may govern operation of display 44 and may process graphics and text for display on display 44. Further, controller 86 may process touch events received through the touch screen of display 44.

Display 44 may display screens of GUI 48 prompting a user to enter a user input 88 through touch screen 45. User input 88 may include a value specifying properties of the HVAC system. For example, a screen may prompt a user to select one of the graphical elements 50 to adjust a temperature set point or to determine the heating or cooling mode. In another example, display 44 may display setup screens prompting a user to input a schedule for the HVAC system.

User input 88 also may be received through an input/output (I/O) port 90. The I/O port may be a serial port, USB port, media card port, IEEE-1394 port, network interface, or other suitable interface configured to receive input from an external device. For example, the I/O port may be a USB port for connecting to a USB drive or flash drive. In certain embodiments, the I/O port may be a wireless interface for connecting to a computer, cell phone, or personal navigation device over a wireless network, such as an IEEE 802.11x wireless network. Moreover, in certain embodiments, screens of GUI 46 may be transmitted through I/O port 90 to an external device, such as a cell phone or computer, to facilitate control of controller 22 through the external device.

According to certain embodiments, I/O port 90 may be employed to receive media storage devices, such as micro SD cards or the like, that contain configuration information for equipment installed within HVAC system 52. The configuration information may facilitate determining system operation parameters, such as minimum and maximum airflow, and may facilitate displaying specific unit information, such as model number, serial number, unit type, and/or unit capacity. Controller 22 may receive the configuration information through I/O port 90 and may transfer the information to memory 84. Further, controller 22 may transfer the information through control circuits 58, 60, and 62 to the units themselves. In the event that the information is lost from the memory of controller 22 and or control circuits 58, 60, and 62, the media storage card may again be connected to I/O port 90 to facilitate retrieval of configuration information. In certain embodiments, the media storage device may be included with the indoor and/or outdoor units when they are shipped from the factory.

A communication interface 92 may transmit information received through I/O port 90 to processor 82. In certain embodiments, communication interface 92 may process data prior to transmitting the data to processor 82. Communication interface 92 also may provide an infrastructure for communicating information from I/O port 90 and processor 82 to the indoor and outdoor units 28, 30, 54, 74 (FIG. 4) within the HVAC system. In certain embodiments, the communication interface may be a serial communication interface including one or more protocols for transmitting and/or receiving communication packets containing control signals. For example, the communication interface may employ one or more protocols such as Modbus, BACnet, DNET, or PROFIBUS (Process Field Bus). In certain embodiments, the communication interface may include a Controller Area Network (CAN) chip for communicating with the indoor and outdoor units, with the auxiliary heating system, and/or with external devices. According to exemplary embodiments, communication interface 92 may employ packet switching to route communication packets to the indoor and outdoor units and to the auxiliary heating system. Further, in certain embodiments, communication interface 92 may communicate with external servers, devices, and/or systems. For example, communication interface 92 may connect through a network to a weather information provider to obtain weather forecast and/or real time information.

Figure 6:
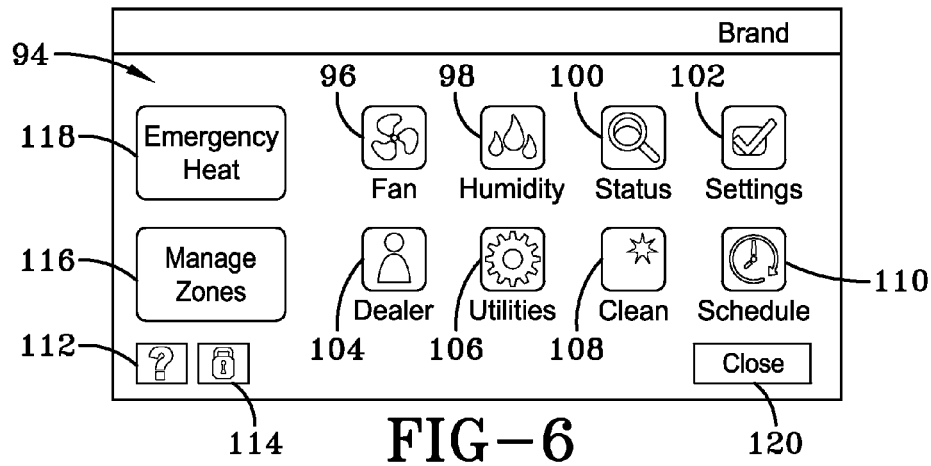
FIG. 6 is a view of a menu screen of the controller of FIG. 5.

FIG. 6 depicts a menu screen 94 of GUI 46 for viewing, changing, or initially entering settings of HVAC system 52. In certain embodiments, screen 94 may be displayed by selecting graphical element 50D from the home screen shown in FIG. 3. Screen 94 includes graphical elements 96, 98, 100, 102, 104, 106, 108, and 110 that may be selected by a user through touch screen 45 to display various screens and submenus of GUI 46 for adjusting settings and/or operating parameters. For example, a user may select graphical element 100 to view system status information, such as the operating state of equipment, upgrades available for the system, and historical trend information for the system, among others. In another example, a user may select one of the graphical elements 96, 98, 102, 104, 106, or 110 to display a menu for adjusting fan settings, humidity settings, general settings, dealer information, system utilities, or operating schedules. A user may select graphical element 108 to view a screen that may facilitate cleaning of display 44.

Screen 104 also includes graphical elements 112 and 114 that may be selected to view other screens of GUI 48, such as a help screen and a password or PIN screen. A graphical element 116 may be selected to adjust settings for zones within HVAC system 52. For example, HVAC system 52 may include electrically controlled dampers that are independently controlled by controller 22 to adjust the airflow to different areas, or zones, within the building. The zones may allow HVAC system 52 to maintain different environmental conditions, such as temperature, humidity, or airflow, within different areas of the building. In certain embodiments, each zone may have a slave controller that communicates with controller 22. Further, in other embodiments, each zone may be controlled by controller 22 with each zone having separate temperature and/or humidity sensors. Further, a graphical element 118 may be selected to enable emergency heating. For example, graphical element 118 may be selected to override current system settings and provide emergency heat using auxiliary heating system 54. Menu screen 104 also includes a graphical element 120 that may be selected to close the menu screen and return to the home screen shown in FIG. 3.

FIG. 7 depicts a screen 122 that may be employed by a user to view information about the system status. For example, controller 22 may display screen 122 in response to selection of graphical element 100 shown in FIG. 6. Screen 122 includes a virtual representation 124 of HVAC system 52. Virtual representation 124 may facilitate a user's understanding of how components within HVAC system 52 operate and interact with one another. For example, virtual representation 124 may be employed to assist a user in identifying faults within HVAC system 52, upgrading HVAC system 52, and/or viewing the operating status of HVAC system 52. Further, virtual representation 124 may enable a user to identify physical equipment within a user's home that corresponds to the item shown on virtual representation 124. For example, virtual representation 124 may include a graphical element 126 that corresponds to outdoor unit 30 and a graphical element 128 that corresponds to indoor unit 28 (FIG. 4). Virtual representation 124 also may include graphical elements representing accessory components included within HVAC system 52. For example, virtual representation 124 may include a graphical element 130 corresponding to a humidifier, a graphical element 132 corresponding to UV lamps, and a graphical element 134 corresponding to an electronic air cleaner (EAC). In other embodiments, virtual representation 124 may include other combinations of equipment and/or accessories depending on the physical equipment and/or accessories included within the HVAC system. For example, virtual representation 124 may include graphical elements representing a zone control panel, zone controllers, zone sensors, dehumidifiers, energy/heat recovery ventilators, thermostats, electronic air cleaners, vents, heat pumps, air conditioners, fossil fuel furnaces, natural gas furnaces, and/or electric heaters, among others. Virtual representation 124 also may include a graphical element 136 that corresponds to controller 22. In general, virtual representation 124 may be designed to provide an intuitive representation of the HVAC system to facilitate user understanding of conditions within the HVAC system.

Screen 122 also may include status indicators 138 and 139 that describe the current state of equipment within HVAC system 52. Specifically, status indicator 139 may display the status of outdoor unit 30, as represented by graphical element 126. Status indicators 138 may display the status of equipment within indoor unit 28, as represented by graphical element 128. For example, status indicators 138 may display the status of the thermostat or controller, humidifier, UV lamps, electronic air cleaner, and furnace. In certain embodiments, each indicator may be shown in a color that matches a color of one of the graphical elements 126, 128, 130, 132, 134, and 136.

Status indicators 138 and 139 may generally allow a user to view how equipment within HVAC system 52 is operating. For example, status indicators 138 and 139 may show whether a unit is on, off, or not installed. For example, indicator 139 shows that the heat pump is off. In another example, the electronic air cleaner indicator 138 shows that the electronic air cleaner is not installed. In certain embodiments, indicators 138 that represent equipment that is not currently installed may be shown in a separate color, such as grey, to indicate that the equipment is not included within HVAC system 52.

Indicators 138 and 139 may include graphical elements that may be selected by a user to display details about the equipment. For example, as described further below with respect to FIGS. 14 and 15, the indicator for the electronic air cleaner may be selected by a user to obtain information for upgrading HVAC system 52 to include an electronic air cleaner. In another example, as described further below with respect to FIG. 8, status indicator 139 may include a graphical element that may be selected to determine why the heat pump is not operational.

Virtual representation 124 also may include one or more faults indicators 140 that may be displayed when a fault is detected within HVAC system 52. For example, fault indicator 140 may be shown on graphical element 126 to show that the heat pump is not functioning properly. Further, in certain embodiments, other types of indicators, such as a change in color, shading, or animation, may be used to indicate a change in an operating state. The fault indicators may be designed to facilitate identification of a fault condition within HVAC system 52 and may facilitate understanding of the location of the problem. For example, virtual representation 124 may allow a user to recognize that although the furnace is operational, as shown by indicator 138, the heat pump is not functioning, as shown by indicator 139.

Screen 122 also includes a graphical element 142 that may be used to refresh the virtual representation 124. Graphical element 142 may facilitate viewing of the system status and expedite troubleshooting by showing the system status in real time. For example, after correcting a fault condition at the physical unit, a technician may select graphical element 142 to refresh virtual representation 124. The technician may view the refreshed virtual representation 124 to verify that the fault indicator 140 no longer appears, indicating the problem has been fixed.

Screen 122 also may include graphical elements 144, 146, and 148 for navigating with other screens of GUI 46. For example, graphical element 144 may be selected to display maintenance information for HVAC system 52, such as maintenance reminders or maintenance guides. Graphical element 146 may be selected to determine whether upgrades are available for HVAC system 52. Further, graphical element 148 may be selected to view sub-menus displaying other types of status information, such as service manuals or historical data, among others.

As shown in FIG. 8, virtual representation 124 also may enable a user to view additional information about an existing fault. For example, a user may select fault indicator 140 through touch screen 45 to display a popup window 150 that describes the system fault. Window 150 may display actions that a user may take to remedy the fault situation. For example, as shown, window 150 displays instructions to switch the setting to "Off" and then back to "Heat." Window 150 also may display additional information about the fault. For example, in certain embodiments, window 150 may display an exploded view of the unit or units experiencing the fault. Specific equipment requiring repair or adjustment within the exploded view may be highlighted or otherwise identified to facilitate troubleshooting. Further, the status of each part shown in an exploded view may be displayed. For example, in a heat pump, an exploded view may show graphical representations and status indicators for the compressor, motor, capacitors, contactors, pressure control valves, reversing valves, solenoids, a distributor assembly, a fan blade, a condenser coil, a filter, a muffler, relays, and switches, among others others. In certain embodiments, the exploded view may be particularly useful for service technicians performing repairs.

In response to selection of fault indicator 140, controller 22 also may display dealer and/or repair service information 152. For example, information 152 may show the name of the dealer that sold HVAC system 52 to the user. A user may select a graphical element 154 to view contact information for the dealer. For example, a user may wish to contact the dealer to obtain assistance if resolving a system fault. A user may select a graphical element 156 to directly contact the dealer and/or request a service call. For example, in response to selection of graphical element 156, controller 22 may send a text message, e-mail, or the like to the dealer. In certain embodiments, controller 22 may retrieve the dealer contact information from memory 84 (FIG. 5). Controller 22 may then transmit a general request for a service call and/or information to the dealer through communication interface 92 (FIG. 5). After a user has finished viewing information about the fault, a user may select graphical element 158 to close window 150.

FIG. 9 depicts a screen 160 displaying another embodiment of a virtual representation 162. Virtual representation 162 includes graphical elements 164, 166, 168, and 170 that may be used to represent a humidifier, UV lamps, an electronic air cleaner, and an outdoor fan within HVAC system 52. In certain embodiments, the graphical elements 164, 166, 168, and 170 may be shown one color, such as yellow when the corresponding equipment is operating correctly, and may be shown in another color, such as red, when a fault occurs.

Further, some of the graphical elements may include animation to indicate when the corresponding equipment is operational. For example, the fan graphical element 170 may rotate to indicate that the fan is functioning. Virtual representation 162 also may include arrows 172, which in certain embodiments, may be animated to indicate that air is being moved through HVAC system 52. Virtual representation 162 also may include a graphical element 174 for an electronic heater within auxiliary heating system 54 (FIG. 4). In certain embodiments, graphical element 174 may be shown in orange to indicate that the coils are currently heating. A graphical element 176 may represent the indoor blower and may include animation that rotates to show that the blower is operational. Further, virtual representation 162 may incorporate other graphical techniques to communicate the status of HVAC system 52, such as, for example, pulsing graphics to represent motion, sequence graphics to represent flow directions, or varying colors, and the like.

Virtual representation 162 also may be used to communicate fault conditions and/or equipment malfunctions. For example, an indicator 178 may appear around a graphical element, such as graphical element 179, to indicate that the corresponding piece of equipment that is not functioning correctly. As shown, fault indictor 178 appears around the outdoor unit that includes the fan graphical element 170 and a compressor graphical element 179. Compressor graphical element 179 may be shown in another color, such as red, to communicate to a user that the compressor is inoperable. After a user is done viewing virtual representation 162, a user may select graphical element 180 to exit the status mode and return to a main screen.

In other embodiments, the graphical elements shown in virtual representations 162 and 124 may vary depending on factors such as the equipment included within the HVAC system, the type of equipment included within the HVAC system, among others. For example, in certain embodiments, electric heating elements 174 may be replaced by a flame icon that corresponds to a fossil fuel furnace, rather than the electronic heater shown in FIG. 9.

FIG. 10 depicts another way controller 22 may alert a user to a fault condition. In addition to, or instead of, indicating a fault condition through a virtual representation, controller 22 may display a window 182 that alerts a user when a fault has occurred. For example, as shown in FIG. 10, a window 182 may be displayed over the main screen with text and a corresponding graphic that alerts the user that a system malfunction has been identified. Window 182 may include a graphical element 184 that identifies the equipment where the malfunction has occurred. Further, window 182 may include graphical elements 186, 188, and 190 that may be selected by a user to take actions related to the fault condition. For example, a user may select graphical element 186 to view corrective actions for troubleshooting the fault. In another example, a user may select graphical element 188 to contact a service technician. In yet another example, a user may select graphical element 190 to ignore the fault.

FIG. 11 depicts a screen 192 that may display operating conditions, parameters, and/or the status of HVAC system 52. Screen 192 may include graphs 194 corresponding to operating conditions of the HVAC system, such as the average indoor temperature, the average humidity, the average temperature set point, the average humidity set point, the average outdoor temperature, the percent of time on, the average furnace firing rate, and the heat pump capacity, among others. Graphs 194 may include labels 196 identifying the information shown by each graph 194 and values 198 identifying the value represented by each graph 194.

Graphs 194 may allow a user to view how effectively and/or efficiently the HVAC system is operating and, in certain embodiments, may assure the homeowner that she is getting value from her investment in the HVAC system. Information shown on screen 192 may be shown for any period of time, such as the last day, week, month, year, or for user selected dates. Moreover, graphs 194 may be customized to show the operating conditions that a user is most interested in, and may be customized for operating modes such as heating operations, cooling operation, continuous fan operation, or system idle. Further, graphs 194 may be replaced by other types of information displays, such as charts, averages, trends, minimums, maximums, or combinations thereof, among others. In certain embodiments, the information displayed on screen 192 may be downloaded by a user through communication interface 92 and/or through I/O port 90. Further, a user may select graphical elements 200 and 202 to move forward or backwards through other reports within GUI 46. After a user is finished viewing reports, a user may select graphical element 120 to exit the reporting mode.

FIG. 12 depicts another embodiment of status screen that shows a virtual representation of HVAC system along with corresponding graphs. Specifically, screen 204 includes a virtual representation 208. Virtual representation 208 is generally similar to virtual representation 162 shown in FIG. 9; however, virtual representation 208 includes graphical elements for a fossil fuel furnace 210. Specifically, a flame graphical element 212 is shown to represent active operation of the fossil fuel furnace. Further, graphic 212 may modulate in accordance with the firing rate of the furnace, for example, by varying the amount of color, brightness, intensity, or fill within graphical element 212. Virtual representation 208 also includes arrows 214 to show that heat is being released to the outside from the outdoor unit. Further, arrows 216 and 218 may pulse to show that refrigerant is moving within HVAC system 52. Further, the color and/or direction of arrows 216 and 218 may change depending on the operating mode of the system.

Screen 204 also may include a comfort report section 220 that displays graphs 224 and 228 of system operating parameters. For example, graphs 224 may display operating parameters for the indoor furnace while graphs 224 display operating parameters for the outdoor unit, functioning here as a heat pump. Labels 226 may be displayed above each graph to identify the operating condition being displayed. Further, values 228 and a corresponding description may be displayed on the graphs 228. Further, in other embodiments, graphs may be replaced by other formats, such as charts, trends, or diagrams, among others.

Graphs 222 and 224 may be used to communicate the operating state of the system, such as whether the HVAC system is operating in first stage compressor cooling or second stage compressor cooling and, in certain embodiments, may be used to explain why the indoor airflow is lower when the system is operating in second stage cooling. Further, the graphs 222 may be used to indicate that the system is currently dehumidifying and operating in first stage compressor cooling. Through this information, controller 22 may communicate to a user the reason that the indoor airflow is even lower than might normally be expected. Further, in certain embodiments, when an electric heater is used instead of a furnace, graphs may be used to show the heating kilowatts and capacity.

FIG. 13 depicts another embodiment of a screen 230 that may be used to display a virtual representation communicating the status of the HVAC system. Screen 230 includes a graphical representation 232 of outdoor unit 30 and another graphical representation 234 of indoor unit 28. Indicators 236 and 238 may be displayed near graphical representations 232 and 234 that communicate to a user the operational state of the represented equipment. For example, indicator 236 may indicate that the indoor unit represented by graphical representation 234 is currently humidifying air. In another example, indicator 238 may communicate to a user that the outdoor unit represented by graphical representation 232 is currently operating in single stage heating mode. Pulsing animation 240 may be shown around the graphical representations 234 and 236 and may pulse to indicate that the corresponding unit is operational. For instance, animation 240 may gradually grow outward from graphical element 234 to indicate that the unit is active. Further, graphical representations 23s and 234 may change colors, pulse, or display various animations to indicate the state of equipment within each of the corresponding units.

FIGS. 14 and 15 depict embodiments of controller 22 that may include screens for displaying upgrade information for HVAC system 52. For example, a window 242 may be displayed on a screen if a user attempts to select a function not currently supported by the HVAC system. For example, window 242 may appear in systems that do not have a humidifier installed when a user attempts to select graphical element 98 to adjust humidity settings. Window 242 may display a notice 244 to the user that alerts the user that desired equipment is not installed. An image 246 of the equipment also may be displayed in window 242 to facilitate user identification of the desired equipment. Further, window 242 may include dealer information 152 that describes how the desired equipment may be purchased. A user also may select graphical element 154 to obtain the dealer's contact information, and may select graphical element 156 to send a message requesting the upgrade to the dealer.

FIG. 15 depicts a screen that may be used to display available upgrades. For example, a user may select a graphical element 146 (FIG. 7) to prompt controller 22 to check for available upgrades. Controller 22 may then display a screen 248 that displays upgrade information. For example, controller 22 may compare the currently connected equipment to a table of available equipment and determine which equipment is missing but compatible with the system. Virtual representation 208 may be displayed on screen 248 with the available equipment highlighted and/or connected to the existing equipment to enable user understanding of the available upgrade. A window 250 may be displayed on screen 248 that describes the available upgrade and provides details about the functionality of the upgrade. Further, multiple upgrades may be available and arrows 252 may be used to scroll through windows showing each of the available upgrades. As discussed above, graphical elements 154 and 156 may be used to contact the dealer and obtain the desired upgrade.

FIG. 16 depicts a window 254 that may be used to communicate maintenance items and/or upgrade items to a user. For example, when controller 22 detects that UV lamps are due for replacement, a window 254 may be displayed over the home screen of controller 22. Window 254 may include information 256 describing the required maintenance. Window 254 also may include information 258 describing the equipment, such as the model number of replacement lamps, that is required for the maintenance service. An image 260 may be shown of the equipment to facilitate user understanding of the required maintenance. Dealer information 262 also may be displayed to facilitate ordering of the maintenance items and/or requesting maintenance services. As described above, graphical element 156 may be selected to send a message to the dealer requesting service. Further, a graphical element 264 may be selected to set a reminder. For example, a user may add a reminder to a calendar application included within controller 22. In certain embodiments, controller 22 may communicate the calendar event to an external device, such as a cell phone or computer, to place the reminder on the user's calendar. Further, if the service has already been performed, a user may select graphical element 266 to reset the reminder.

Window 254 also includes a graphical element 268 that may be selected to display upgrade options to facilitate increasing or improving user comfort, HVAC system performance, and the like. For example, a user may desire a different model of UV lamps. In certain embodiments, dealers may offer discounts on upgrades and may present these discounts through controller 22. Further, in other embodiments, windows may be used to suggest repair parts and provide information about the price of parts, the time expected for the service call, and costs. Window 254 also may include a scroll bar 270 that a user may select to view additional information, such a dealer's address and phone number, within window 254.

As depicted in FIG. 17, GUI 46 also may be used to provide maintenance instructions to a user. For example, a user may select graphical element 148 (FIG. 7) to navigate through submenus of the status menu to display a screen 272 with maintenance instructions. Screen 272 may include a virtual representation 274 of the HVAC system and may display instructions 276 for performing maintenance. Further, animation 278 may be included to identify the area within HVAC system 52 that should receive the maintenance. For example, animation 278 may identify the location of the air filter within the HVAC system and instructions 276 may instruct a user on how to access the air filter within the HVAC housing. Screen 272 also may include graphical elements 200 and 202 that may be selected by a user to view a previous or next step for performing the maintenance. Further, in other embodiments, information, such as appropriate replacement parts, may be shown on screen 272.

Further, in other embodiments, various maintenance tasks such as replacing a humidifier pad, among others may be shown through GUI 46 of controller 22. The display of instructions on controller 22 may reduce or eliminate the need for a printed user's guide and may offer easy accessibility with clear, animated, extensible, and updatable instructions to assist the homeowner or repair technician in the performance of maintenance tasks and minor repairs. Further, the instructions shown through controller 22 may be tailored to the specific HVAC system installed in the user's home or building. For example, controller 22 may detect the type of equipment installed within HVAC system 52, for example, through communication interface 92, and may customize the information shown on controller 22 to correspond to the installed equipment.

Controller 22 also may be used to provide a user with an enhanced understanding of the operation of HVAC system 52. For example, as shown in FIG. 18, a screen 280 may be displayed that describes the defrost mode of heat pump operation. In general, heat pump operation may be poorly understood by service technicians and/or homeowners. Illustrations traditionally have been included in paper literature; however these documents may not always be kept with the HVAC system. Accordingly, the information may be displayed on controller 22 to increase accessibility to the information. Further, controller 22 may customize the instructions to the specific HVAC system 52, for example, by detecting the current operating state and displaying information related to the current operating state. For example, screen 280 includes regions 282, 284, 286, 288, and 290 that correspond to defrost conditions of the heat pump. An indicator 294 may be displayed in the region where the heat pump is currently operating to communicate the current operating status to the user. For example, as shown, the heat pump is currently operation in region 290, which does not allow for a timed defrost.

Screen 280 also may display indicators 296 that show historical information. Indicators 296 may be of a smaller size, a different color, or the like, from indicator 294 to allow a user to distinguish the current operating state from the historical conditions. Further, in certain embodiments, indicators 296 may decrease in size in proportion to the amount of time that has elapsed. Indicators 296 and 294 also may allow a user to predict future performance of the HVAC system.

Although FIG. 18 depicts operation of the defrost mode for a heat pump, other screens may be used to represent a wide variety of operating conditions. For example, a screen may be used to show how indoor airflow corresponds to compressor stages. For example, regions may be shown that correspond to first stage operation with low airflow, second stage operation with high airflow, second stage operation with low airflow, and second stage operation with high airflow. Trend information, for example, through indicators 296 and 294, also may be displayed on the screen. A screen correlating airflow to compressor capacity may allow a user to visually see how indoor airflow may be reduced in certain conditions and increased in others.

In general, the screens depicted in FIGS. 7-18 may facilitate user understanding of HVAC system operation through virtual representations of the HVAC system. As may be appreciated, the relative sizes, shapes, and configurations of the virtual representations, graphical elements, screens, and windows shown herein may vary depending on system functionality, user preference, and/or system equipment, among others.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A control device comprising:
   a communication interface suitable for operable connection to one or more units of a heating, ventilating, air conditioning, or cooling system;
   a display; and
   a processor configured to:
      detect, through the communication interface, an operating status of each of the one or more units;
      generate a virtual representation of the heating, ventilating, air conditioning, or cooling system on the display based on the operating status of each of the one or more units, wherein the virtual representation comprises graphical elements representing a presently installed physical configuration of each of the one or more units and the connections therebetween and indicators identifying the operating status of each of the one or more units; and
      generate, on the display, a recommendation for an additional unit item based on the operating status or based on user input selecting a feature not supported by the heating, ventilating, air conditioning, or cooling system.

2. The control device of claim 1, wherein the units comprise a heat pump, an air conditioner, a furnace, ultraviolet lamps, a humidifier, or an electronic air cleaner, or a combination thereof.

3. The control device of claim 1, wherein the virtual representation includes a graphical element corresponding to the control device.

4. The control device of claim 1, wherein each of the indicators comprise a first graphic corresponding to an operational condition and a second graphic corresponding to a fault condition, and the control device is configured to display trouble shooting information including a listing of corrective actions for a particular unit based on selection of a corresponding one of the indicators.

5. The control device of claim 1, comprising a graphical user interface configured to receive a user input that selects one of the graphical elements to display operating conditions for the unit corresponding to the selected graphical element, wherein the operating conditions comprise a heating capacity, a cooling capacity, a temperature set point, a humidity set point, an average temperature, or historical data, or combinations thereof.

6. The control device of claim 1, wherein generating the recommendation for the additional unit item comprises indicating a representation of a maintenance item that should be replaced based on the operating status or indicating an upgrade item required for the feature selected by the user input.

7. The control device of claim 1, wherein generating the recommendation for the additional unit item comprises generating an image of the additional unit item on the display.

8. The control device of claim 1, wherein generating the recommendation for the additional unit item comprises generating an image of the additional unit item on the display in a proposed installed orientation relative to the presently installed physical configuration of each of the one or more units and the connections therebetween.

9. The control device of claim 1, wherein generating the recommendation for the additional unit item comprises generating an interactive graphical element that when selected causes the control device to check availability of the unit item, display contact information for a dealer capable of providing the unit item, set a reminder, or send a message to the dealer capable of providing the unit item.

10. A method comprising:
    displaying, on a display of a controller, a virtual representation of a heating, ventilating, air conditioning, or cooling system generated based on an operating status of units of the heating, ventilating, air conditioning, or cooling system, wherein the virtual representation comprises graphical elements representing a presently installed physical configuration of the units of the heating, ventilating, air conditioning, or cooling system;
    detecting a change in an operating status of one of the units that indicates a maintenance item should be replaced or detecting user selection of a feature that requires an upgrade item; and
    displaying, on the display, a recommendation for replacement of the maintenance item based on the operating status or a recommendation for the upgrade item based the user selection.

11. The method of claim 10, wherein detecting a change in an operating status comprises detecting a fault condition.

12. The method of claim 11, comprising displaying troubleshooting information for the fault condition including a listing of corrective actions.

13. The method of claim 10, wherein displaying the virtual representation and displaying the recommendation comprises displaying connections between a representation of the upgrade item and the graphical elements depicting units of the heating, ventilating, air conditioning, or cooling system.

14. The method of claim 13, comprising receiving a user input selecting a feature not supported by the heating, ventilating, air conditioning, or cooling system, and identifying the one or more additional units that support the feature.

15. The method of claim 14, wherein identifying the one or more additional units that support the feature comprises generating a representation of an ultraviolet light air purifier unit, a humidifier unit, or a ventilator unit on the display.

16. The method of claim 10, comprising detecting user selection of the feature that requires the upgrade item and displaying available upgrades or contact information for a dealer capable of providing the upgrade item.

17. The method of claim 10, comprising detecting the operating status of one of the units that indicates the maintenance items should be replaced and displaying contact information for a dealer capable of providing the maintenance item.

18. The method of claim 10, wherein displaying the recommendation comprises displaying an interactive graphic that causes the controller to contact a dealer capable of providing the upgrade or maintenance item, or communicate a reminder to an external device.

19. A method comprising:
- displaying, on a display of a controller, a virtual representation of a heating, ventilating, air conditioning, or cooling system generated based on an operating status of units of the heating, ventilating, air conditioning, or cooling system, wherein the virtual representation comprises graphical elements representing a presently installed physical configuration of the units of the heating, ventilating, air conditioning, or cooling system;
- determining, via the controller, one or more maintenance items that should be replaced or additional units that may be connected to the heating, ventilating, air conditioning, or cooling system; and
- displaying a recommendation describing the one or more maintenance items or additional units on the display.

20. The method of claim 19, wherein displaying a recommendation comprises displaying at least one of dealer information, ordering information, or price information for the one or more maintenance items or additional units.

* * * * *